United States Patent
Lee et al.

(10) Patent No.: US 11,459,921 B2
(45) Date of Patent: Oct. 4, 2022

(54) ACOUSTIC ABSORBER FOR FAN NOISE REDUCTION

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 873 days.

(21) Appl. No.: 16/296,403

(22) Filed: Mar. 8, 2019

(65) Prior Publication Data
US 2020/0284174 A1    Sep. 10, 2020

(51) Int. Cl.
*F01N 1/02* (2006.01)
*F28F 3/02* (2006.01)
*F01N 1/04* (2006.01)

(52) U.S. Cl.
CPC .............. *F01N 1/023* (2013.01); *F01N 1/026* (2013.01); *F01N 1/04* (2013.01); *F28F 3/02* (2013.01); *F28F 2215/06* (2013.01)

(58) Field of Classification Search
CPC .. G10K 11/172; F24F 2013/245; F01N 1/023; F01N 1/026; F01N 1/04; F28F 3/02; F28F 2215/06

(Continued)

(56) References Cited

U.S. PATENT DOCUMENTS 6,201,872 B1    3/2001  Hersh et al.
6,309,176 B1 *  10/2001 Periyathamby .......... F01P 11/12
                                                              415/173.6

(Continued)

FOREIGN PATENT DOCUMENTS

JP           H1193670 A  *  4/1999

OTHER PUBLICATIONS

U.S. Appl. No. 16/296,412, filed Mar. 8, 2019 (not yet published).

(Continued)

*Primary Examiner* — Jeremy A Luks
(74) *Attorney, Agent, or Firm* — Christopher G. Darrow; Darrow Mustafa PC

(57) ABSTRACT

A sound suppression assembly is provided for absorbing acoustic energy from an air circulation device. The assembly includes an air circulation device, such as an axial fan, and a plurality of sparsely-arranged two-sided Helmholtz unit cells disposed in a periodic array. Each unit cell includes a lossy resonator and a lossless resonator. The lossy resonator includes a first chamber portion bounded by at least one first boundary wall defining a first chamber volume, and a first neck forming an opening in the first chamber portion. The lossless resonator includes a second chamber portion bounded by at least one second boundary wall defining a second chamber volume, and a second neck forming an opening in the second chamber portion. The unit cells can be positioned in a circular pattern with the first neck of the lossy resonators directed to a source of acoustic energy from the air circulation device.

20 Claims, 12 Drawing Sheets

(58) Field of Classification Search
USPC .......................................................... 181/225
See application file for complete search history.

(56) References Cited

U.S. PATENT DOCUMENTS

| | | | |
|---|---|---|---|
| 6,896,095 B2 | 5/2005 | Shah et al. | |
| 7,117,974 B2 | 10/2006 | Moenssen et al. | |
| 7,992,674 B2* | 8/2011 | Gorny | F04D 29/663 |
| | | | 415/119 |
| 8,418,804 B1 | 4/2013 | Hawwa | |
| 8,789,652 B2* | 7/2014 | Swallowe | G10K 11/172 |
| | | | 181/295 |
| 9,607,600 B2* | 3/2017 | Swallowe | G10K 11/172 |
| 10,577,791 B2* | 3/2020 | Hakuta | E04B 1/86 |
| 10,699,688 B2* | 6/2020 | Elford | G10K 11/172 |
| 2007/0292261 A1* | 12/2007 | Tang | F04D 29/663 |
| | | | 415/119 |
| 2020/0005756 A1* | 1/2020 | Lee | G10K 11/172 |
| 2020/0284529 A1* | 9/2020 | Lee | F01N 1/023 |

OTHER PUBLICATIONS

U.S. Appl. No. 16/227,345, filed Dec. 20, 2018 (not yet published).
U.S. Appl. No. 15/962,513, filed Apr. 25, 2018 (not yet published).
U.S. Appl. No. 16/025,630, filed Jul. 2, 2018 (not yet published).
Shen et al., "Acoustic Metacages for Omnidirectional Sound Shielding," The Journal of the Acoustical Society of America, 141(5):3574 20 pages (2017).
Cai et al., "Acoustic performance of different Helmholtz resonator array configurations," Applied Acoustics, vol. 130, pp. 204-209 (2018).
Cheng et al., "Ultra-sparse metasurface for high reflection of low-frequency sound based on artificial Mie resonances," Nature Materials, vol. 14, pp. 1013-1020 (2015).

* cited by examiner

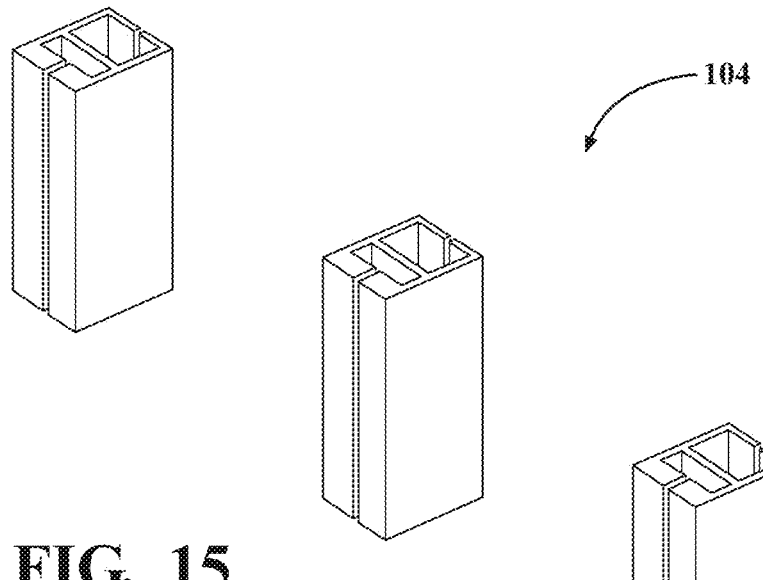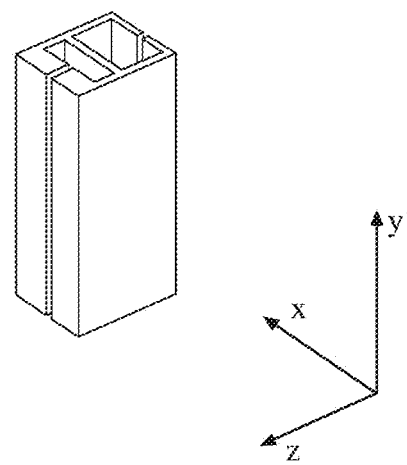
FIG. 15
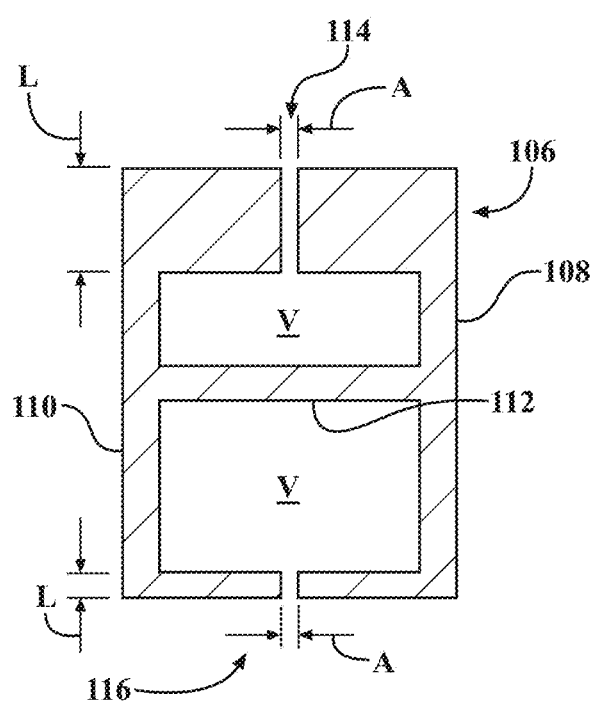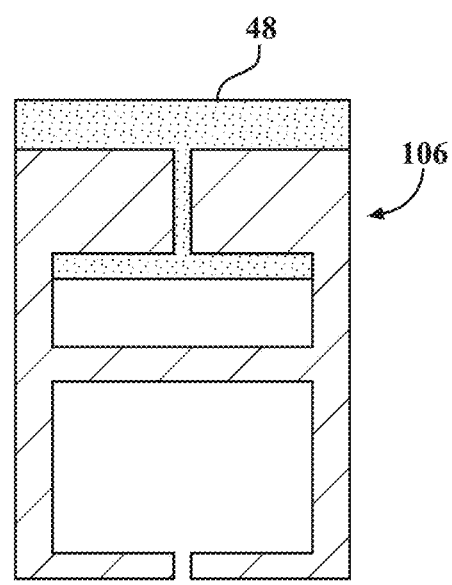
FIG. 16A  FIG. 16B

ACOUSTIC ABSORBER FOR FAN NOISE REDUCTION

TECHNICAL FIELD

The present disclosure generally relates to acoustic metamaterials and, more particularly, to acoustic absorption metamaterials for reducing noises from airflow circulation devices.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Airflow circulation devices, such as fans, are commonly used to create airflow for various applications, including cooling, ventilation, propulsion, and the like. Such fans often generate noises due to fast-rotating motors and turbulence in fluid flow. Conventional acoustic absorbers such as thick foams and plates are generally not suitable for minimizing fan noise because they work as a physical barrier that may block fluid flow in addition to the sound. Other conventional absorbers that may be based on perforated plates allow fluid flow, but only in a limited extent. In order to address and minimize fan noise issues with the above-listed applications, acoustic absorbers are needed that do not compromise fluid flows. Acoustic metamaterials, for example, having elastic acoustic properties that differ from those of their constituent materials, have arrays of periodic structures, typically on a scale smaller than the target wavelength. Such metamaterials are typically solid surfaces that are impermeable to ambient fluid (e.g. air). Such metamaterials also frequently have narrow ranges of effective absorption frequency.

Accordingly, it would be desirable to provide an improved acoustic system having sparse (spaced apart) unit cells that allow fluid to flow freely between the unit cells, and that have very broad frequency absorption range.

SUMMARY

This section provides a general summary of the disclosure, and is not a comprehensive disclosure of its full scope or all of its features.

In various aspects, the present teachings provide a sound suppression assembly for absorbing acoustic energy from an air circulation device. The sound suppression assembly includes an air circulation device and a plurality of sparsely-arranged two-sided Helmholtz unit cells disposed in a periodic array adjacent the air circulation device. Each sparsely-arranged two-sided Helmholtz unit cell includes a lossy resonator and a lossless resonator. The lossy resonator includes a first chamber portion bounded by at least one first boundary wall defining a first chamber volume, and a first neck forming an opening in the first chamber portion. The first neck provides fluid communication between the first chamber portion and an ambient environment. The lossless resonator includes a second chamber portion bounded by at least one second boundary wall defining a second chamber volume, and a second neck forming an opening in the second chamber portion. The second neck provides fluid communication between the second chamber portion and the ambient environment. In various aspects, the plurality of sparsely-arranged two-sided Helmholtz unit cells are positioned in a circular pattern with the first neck of the lossy resonators directed to a source of acoustic energy from the air circulation device.

In other aspects, the present teachings provide a sound suppression assembly for absorbing acoustic energy from an axial fan. The sound suppression assembly includes a shroud defining an inner surface and an outer surface, and a central hub component. The assembly includes a plurality of sparsely-arranged two-sided Helmholtz unit cells disposed in a periodic array between the inner surface of the shroud and the central hub component. Each sparsely-arranged two-sided Helmholtz unit cell includes a lossy resonator and a lossless resonator. The lossy resonator includes a first chamber portion bounded by at least one first boundary wall defining a first chamber volume, and a first neck forming an opening in the first chamber portion. The first neck provides fluid communication between the first chamber portion and an ambient environment. The lossless resonator includes a second chamber portion bounded by at least one second boundary wall defining a second chamber volume, and a second neck forming an opening in the second chamber portion. The second neck provides fluid communication between the second chamber portion and the ambient environment.

In still other aspects, the present teachings provide a method of suppressing sound from an air circulation device. The method includes positioning a plurality of sparsely-arranged two-sided Helmholtz unit cells disposed in a periodic array adjacent the air circulation device. Each sparsely-arranged two-sided Helmholtz unit cell includes a lossy resonator directed to a source of acoustic energy from the air circulation device, and a lossless resonator. The lossy resonator includes a first chamber portion bounded by at least one first boundary wall defining a first chamber volume, and a first neck forming an opening in the first chamber portion. The first neck provides fluid communication between the first chamber portion and an ambient environment. The lossless resonator includes a second chamber portion bounded by at least one second boundary wall defining a second chamber volume, and a second neck forming an opening in the second chamber portion. The second neck provides fluid communication between the second chamber portion and the ambient environment. The method includes directing an airflow from the air circulation device to the respective first necks of the lossy resonators. In various aspects, the unit cells are disposed in a circular periodic array between an inner surface of a shroud and a central hub component. The method may also include aligning the shroud with an airflow from an axial fan.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 15 illustrates a plurality of unit cells having a second alternate geometric design;

FIGS. 16A-16B are magnified cross-section views of a unit cell of FIG. 15 according to two aspects, with and without an acoustically absorbing medium;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology provides broadband sparse absorption structures arranged for use as sound suppression assemblies for absorbing acoustic energy from an air circulation devices, such as a fan, and the like. The various assemblies disclosed herein include two-sided Helmholtz unit cells disposed having a sparse periodic structure, with open space between adjacent unit cells, thus allowing fluid to flow freely through the structure. The design of the unit cell structure enables it to exhibit very broadband acoustic absorption that is tunable to a desired frequency range with minimal interruption of passing fluid flow.

Different periodic arrays of the unit cells can be provided in different frequencies, for example, as high frequency, intermediate frequency, and low frequency rows, enhancing the frequency range of high efficiency absorption. The broadband sparse absorption structures of the present technology have unique applicability in any application that benefits from sound dampening with respect to an air circulation device, while allowing air or other gaseous fluid to pass freely through for cooling or other purposes. In one example, the unit cells of a broadband sparse absorber, or sound suppression assembly, can surround a fan, thereby rendering the fan noises substantially silent while allowing air to freely pass through. In another example, the units cells can be provided as a portion of a circular cover disposed adjacent an axial fan, with airflow being directly aligned with lossy resonators as will be described in more detail below.

Figure 1:
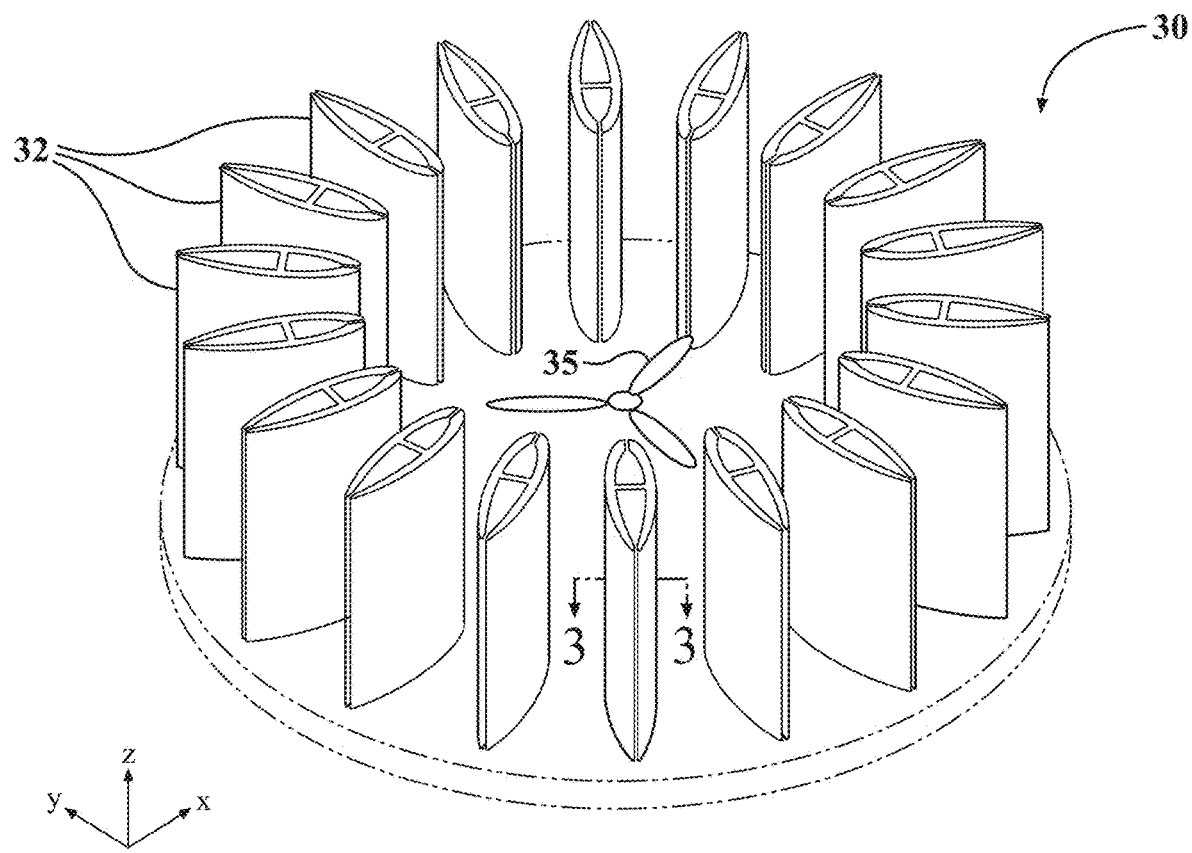
FIG. 1 is a top perspective view of an air circulation device surrounded by an array of broadband sparse acoustic absorbers.
Figure 2:
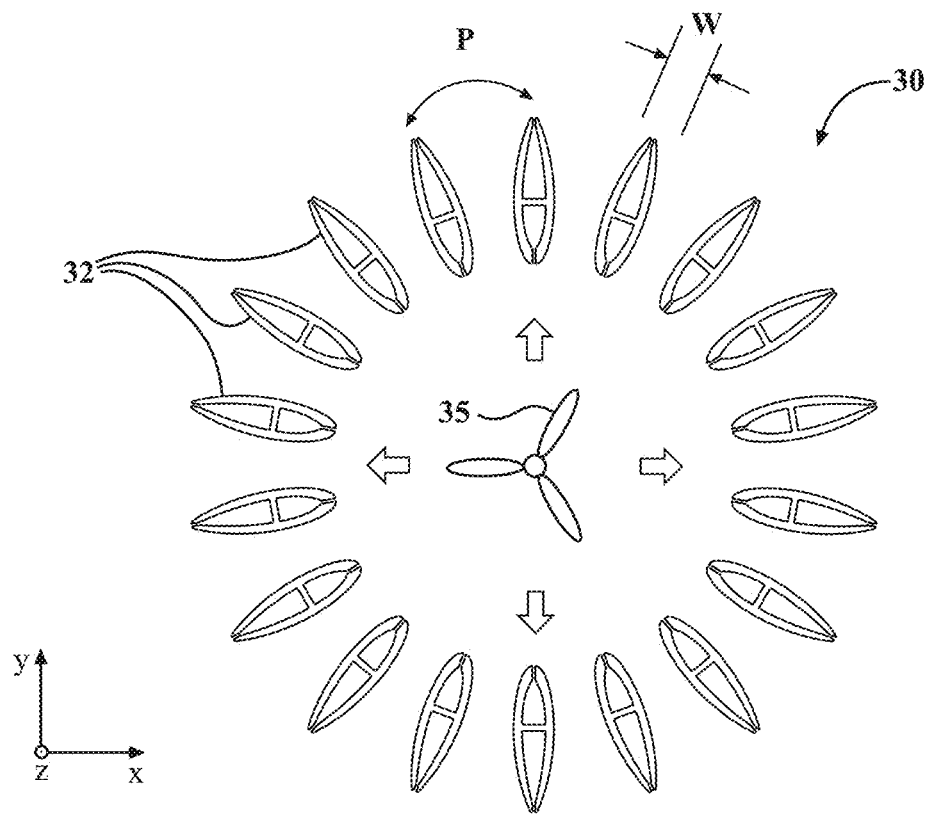
FIG. 2 is a top plan view of FIG. 1.

FIG. 1 is a top perspective view of a sound suppression assembly 30 including an array of broadband sparse acoustic absorbers 32, also referred to as two-sided Helmholtz unit cells, or just unit cells, illustrated as surrounding an air circulation device 35. FIG. 2 is a top plan view of FIG. 1, with arrows further illustrating a direction of acoustic energy, as well as airflow.

In various aspects, the one or more broadband sparse acoustic absorbers 32 of the sound suppression system can surround the air circulation device on one or more sides, such as by forming the walls of a shaped enclosure about the air circulation device. As shown in FIG. 1, the unit cells 32 of the sound suppression assembly 30 can be positioned periodically in a circular pattern on a substrate 25. In certain aspects, the substrate 25 can be provided as a continuous plate with no air permeation (e.g., tow fans). In other aspects, the substrate 25 may be porous, through which ambient fluid can pass with little constraint. Non-limiting examples of such a porous substrate 25 can include a mesh or screen, such as an air screen of the type used in a window, a sheet of material having periodic apertures or perforations, or any other suitable substrate. The unit cells 32 can be joined or coupled in place to the substrate 25 using various known joining and fastening techniques, such as using an adhesive or using a welding technique, depending on the material of the unit cells 32 and/or the substrate 25. In various aspects, the unit cells 32 may be formed as a unitary, monolithic component with the substrate 25. In one example, the substrate 25 and the plurality of unit cells 32 can be made using additive manufacturing or 3-D printing techniques, and can be made of a metal, graphite, or other suitable plastic material. In certain aspects, the unit cells 32 may be thermally conductive. In other aspects, molding and extrusion techniques may be used. In non-limiting aspects, molding and extrusion may be useful with thermally conductive plastics, for example, polymers with thermally conductive fillers.

Figure 3A:
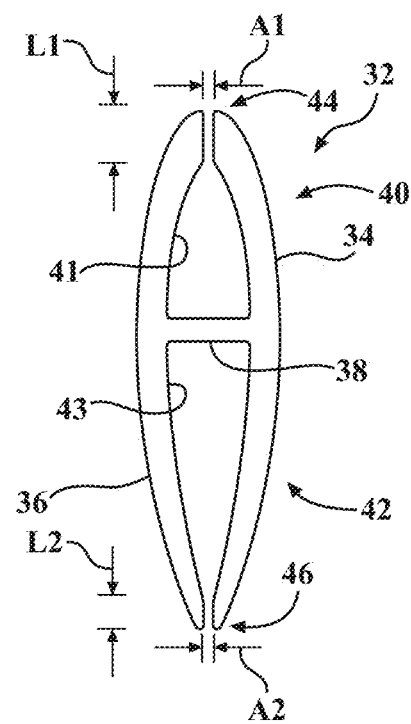
FIGS. 3A-3B are magnified cross-sectional views of a unit cell taken along the line 3-3 of FIG. 1 according to two aspects, with and without an acoustically absorbing medium.

FIG. 3A is a magnified cross-section view of an exemplary unit cell 32 of the absorber of FIG. 1 according to various aspects. Each unit cell 32 includes at least one enclosure wall, although the unit cell 32 of FIGS. 1-3 includes multiple enclosure walls, such as first and second opposing side walls 34, 36, and an interior partition wall 38 that separates the interior of the unit cell 32. The various enclosure walls 34, 36, and interior partition walls 38 are typically formed of a solid, sound reflecting material. In general, the material or materials of which the enclosure walls 34, 36, and interior partition walls 38 are formed will have acoustic impedance higher than that of ambient fluid. Non-limiting examples of such materials can include a thermoplastic resin, such as polyurethane, a ceramic, or any other suitable material.

As shown in FIG. 3A, the unit cell 32 can include a lossy resonator 40 providing a first chamber portion 41 with a first chamber volume $V_1$, and a lossless resonator 42 providing a second chamber portion 43 with a second chamber volume $V_2$. Generally, the lossy resonators 40 are directed toward the noise source. Each unit cell 32 further includes a first longitudinal neck 44, having a length $L_1$ and defining an aperture having a dimension $A_1$ that, when multiplied by a height dimension of the unit cell (in the z direction), defines an area $S_1$ that provides fluid communication between the first chamber portion and an ambient environment (external of the unit cell); and a second longitudinal neck 46 having a length $L_2$ and defining an aperture having a dimension $A_2$ to define an area $S_2$ that provides fluid communication between the second chamber portion and the ambient environment. Acoustic energy is absorbed in the neck due to the viscous friction. In various aspects, the length $L_1$ dimension of the first neck 44 of the lossy resonator 40 is greater than the length $L_2$ dimension of the lossless resonator.

The chamber volumes $V_1$, $V_2$ correspond to a volume of ambient fluid (generally air) that can be held in the respective chamber portions 41, 43, exclusive of the respective neck 44, 46. In various aspects, the lossless resonator 42 second chamber volume $V_2$ is greater than the lossy resonator 40 first chamber volume $V_1$. The magnitude of the variance of the chamber volumes $V_1$, $V_2$ and the neck lengths $L_1$, $L_2$ is generally determined by the desired frequency of the resonators. For example, it is desirable that the resonators 40, 42 within the unit cell 32 each have the same resonance frequency. The variables that affect the resonance frequency are the respective neck length, L, cavity volume, V, and neck area, S, through the relationship of determined by Equation (1) as follows:

$$f = \frac{c}{2\pi}\sqrt{\frac{S}{VL}} \quad \text{Equation (1)}$$

For the remaining variables, f is the resonance frequency of the Helmholtz resonator, and c is the speed of sound in the ambient fluid, neither of which change based on the structural design of the unit cell. In various aspects, the resonance frequency of the unit cell absorbers may be targeted to the operational (i.e., blade passing) frequency of the fan.

Figure 3B:
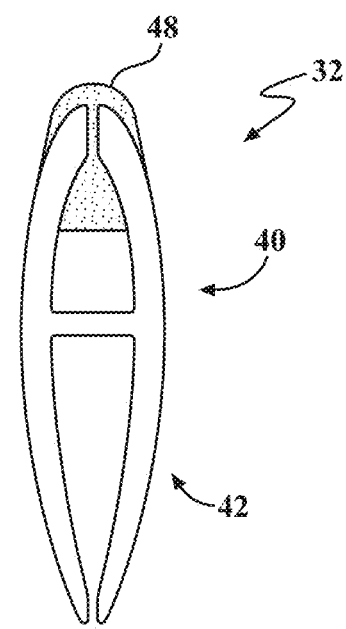

FIG. 3B illustrates the unit cell of FIG. 3A additionally with an optional acoustically absorbing medium 48, such as a foam component. In various aspects, the acoustically absorbing medium 48 can be overlaying and/or partially filling the lossy resonator 40. In the example of FIG. 3B, the acoustically absorbing medium 48 overlays and at least partially covers an outer area adjacent to the first neck 44, and contiguously fills the longitudinal neck 44, as described above, and also fills an adjacent portion, or fraction, of the first chamber 43. In various aspects, the acoustically absorbing medium 48 can be a highly absorptive porous medium, such as a melamine or polyurethane foam, or any other medium having thermal dissipative acoustic properties. In some implementations, the acoustically absorbing medium 48 can have a porosity greater than 0.5, or 0.6, or 0.7, or 0.8, or 0.9.

With particular reference to FIGS. 1-2, the unit cells 32 can be periodic in 2-dimensions (e.g. the x, y dimensions of FIGS. 1-2). In this exemplary arrangement, the periodic array of unit cells 32 has periodicity in both x and y dimensions. This can be termed a two-dimensional array. The plurality of sparsely-arranged two-sided Helmholtz unit cells 32 are positioned in a circular pattern with the first neck 44 of the lossy resonators 40 directed to a source of acoustic energy from the air circulation device 35. With particular reference to FIG. 2, the period, P, of the periodic array of unit cells 32 will generally be substantially smaller than the wavelength of the acoustic waves that the sparse acoustic absorber is designed to absorb. As shown in FIG. 2, the period, P, can be equated to a center-to-center distance between adjacent unit cells. In different implementations, the period of the periodic array of unit cells 32 will be within a range of from about 0.1 to about 0.75, inclusive, of the wavelength of the acoustic waves that the broadband sparse acoustic absorber is designed to absorb, i.e., the wavelength corresponding to the resonance frequency. In certain particular implementations, the period of the periodic array of unit cells 32 will be within a range of from about 0.25 to about 0.5 of the resonance wavelength. For example, in some implementations, the broadband sparse acoustic absorber assembly 30 can be designed to absorb acoustic waves of a human-audible frequency, having a wavelength within a range of from about 17 mm to about 17 m, or some intermediate value contained within this range.

With continued reference to FIG. 2, each unit cell 32 of the periodic array of unit cells will generally have a maximum lateral dimension, or width W. The periodic distance, P, is preferably greater than a maximum lateral width dimension, W, of each unit cell 32. The periodic array of unit cells 32 is further characterized by a fill factor equal to W/P. In general, the fill factor will be 0.5 or less. In some implementations, the fill factor will be 0.25 (i.e., 25%) or less. It will be appreciated that the frequency breadth of efficient absorption of the broadband sparse acoustic assembly 30 (i.e., the broadband nature of absorption) is substantially determined by the fill factor of the periodic array of unit cells 32; the ratio of width, W, to period, P, of the unit cells 32. Thus, a large fill factor (W/P) increases the frequency bandwidth, whereas small fill factor (high sparsity) decreases the bandwidth of efficient absorption. As noted above, the period, P, of the periodic array of unit cells 32 is smaller than the wavelength corresponding to the desired resonance frequency (period<wavelength). At the same time, in many implementations the period, P, and width, W, of unit cells 32 will be chosen so that the periodic array of unit cells 32 has a fill factor of at least 0.2 (i.e. 20%).

Figure 4:
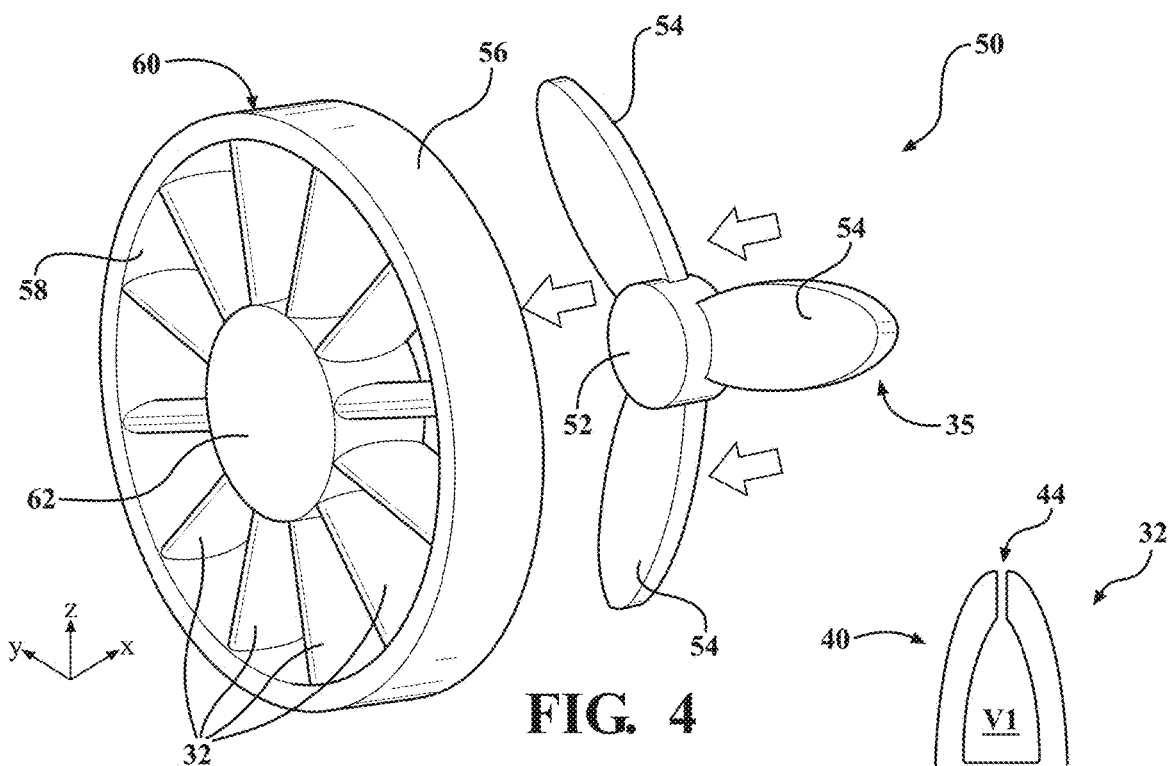
FIG. 4 is a side perspective view of a circular noise reducing cover assembly adjacent a fan.
Figure 6:
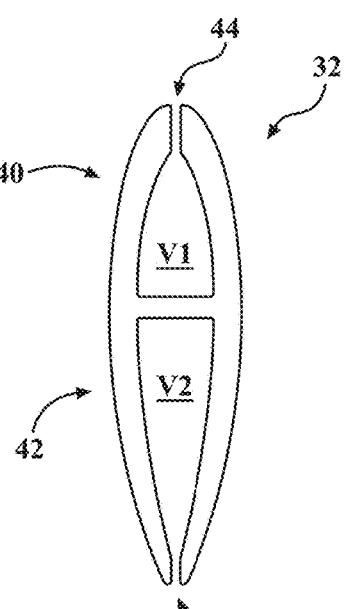
FIG. 6 is magnified cross-sectional view of a unit cell of the noise reducing cover assembly taken along the line 6-6 of FIG. 5.
Figure 5:
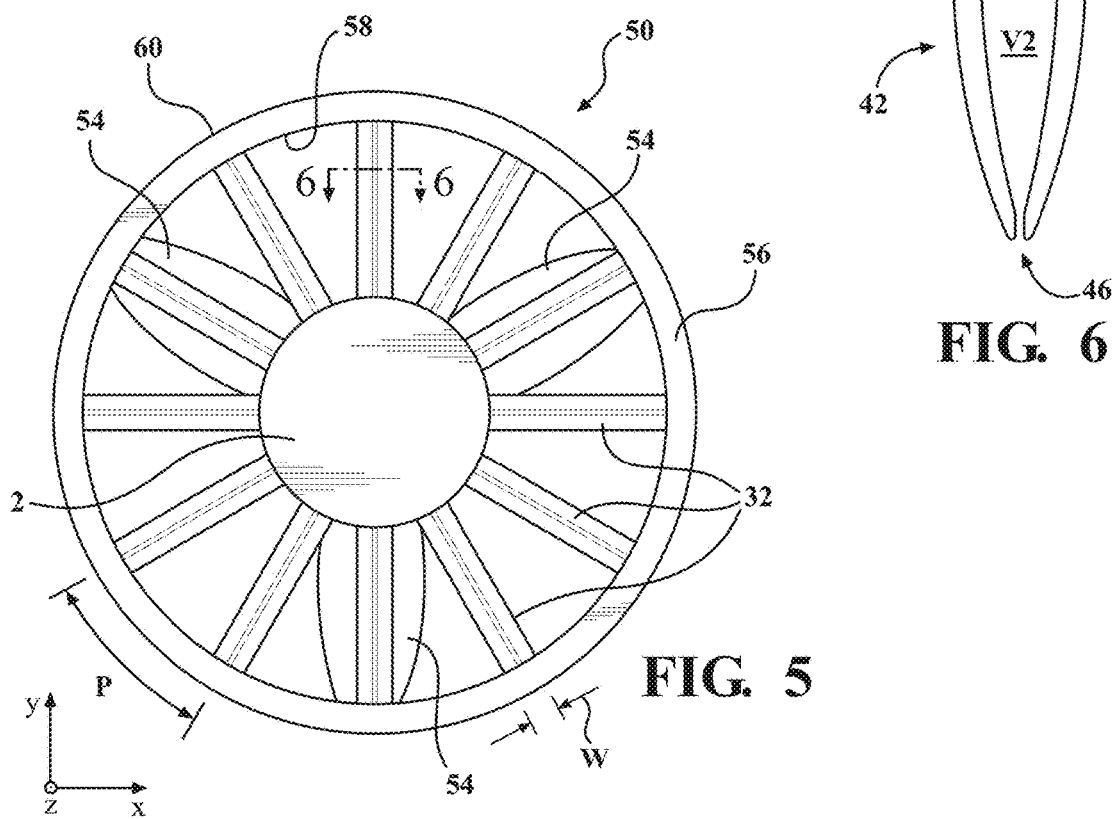
FIG. 5 is a front perspective view of the circular noise reducing cover assembly and fan of FIG. 4.
Figure 7:
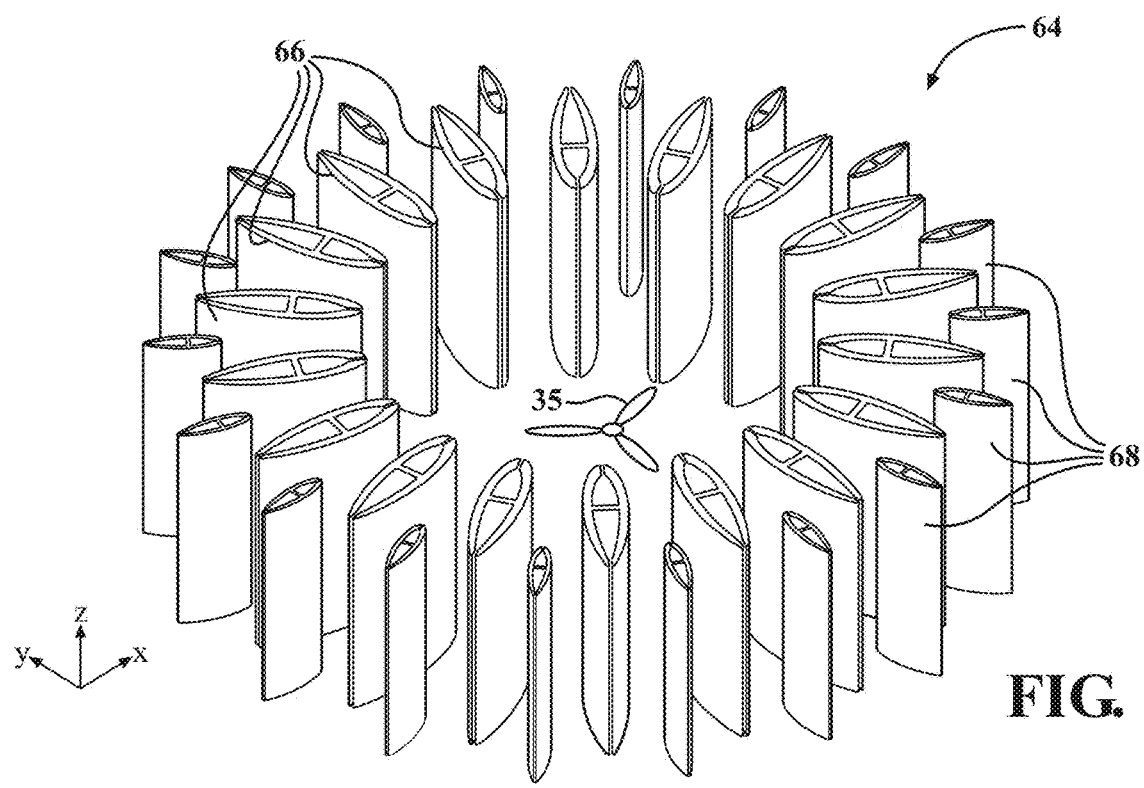
FIG. 7 is a top perspective view of an air circulation device surrounded by two arrays of broadband sparse acoustic absorbers.

FIGS. 4-6 provide another type of sound suppression assembly provided as an array of periodically spaced broadband sparse acoustic absorbers 32 for absorbing acoustic energy from an air circulation device 35. FIG. 4 is a side perspective view of a circular noise reducing cover assembly 50 adjacent an axial fan 35. The arrows in FIG. 4 indicate a direction of airflow as well as acoustic energy. The axial fan 35 may be provided with a center component 52 and a plurality of blades 54 coupled thereto. The center component 52 may include or be coupled to a motor (not shown). The assembly 50 includes a shroud component 56 illustrated as a circular wall with an inner surface 58 and an outer surface 60. A central hub component 62 is located in the center of the shroud 56. As specifically shown, a plurality of sparsely-arranged two-sided Helmholtz unit cells 32 are disposed in a periodic array between the inner surface 58 of the shroud 56 and the central hub component 62. Opposing ends of the unit cells 32 may be coupled or fastened to both the shroud 56 and the center hub component 62 using suitable fastening or adhesive joining techniques based on the materials of the different components.

FIG. 5 is a front perspective view of the circular noise reducing cover assembly and fan of FIG. 4. FIG. 6 is magnified cross-sectional view of a unit cell 32 taken along the line 6-6 of FIG. 5. The various details and features of the unit cells 32 may be the same as those already described above with respect to FIGS. 1-3. For example, the plurality of sparsely-arranged two-sided Helmholtz unit cells 32 are shown positioned in a circular pattern with the first neck 44 of the lossy resonators 40 facing and directed to a source of acoustic energy from the adjacent aligned axial fan 35. The unit cells 32 may be spaced apart by a center-to-center periodic distance, P, between adjacent second necks 46, wherein the periodic distance, P, is greater than a maximum lateral width dimension, W, of each unit cell.

Figure 8:
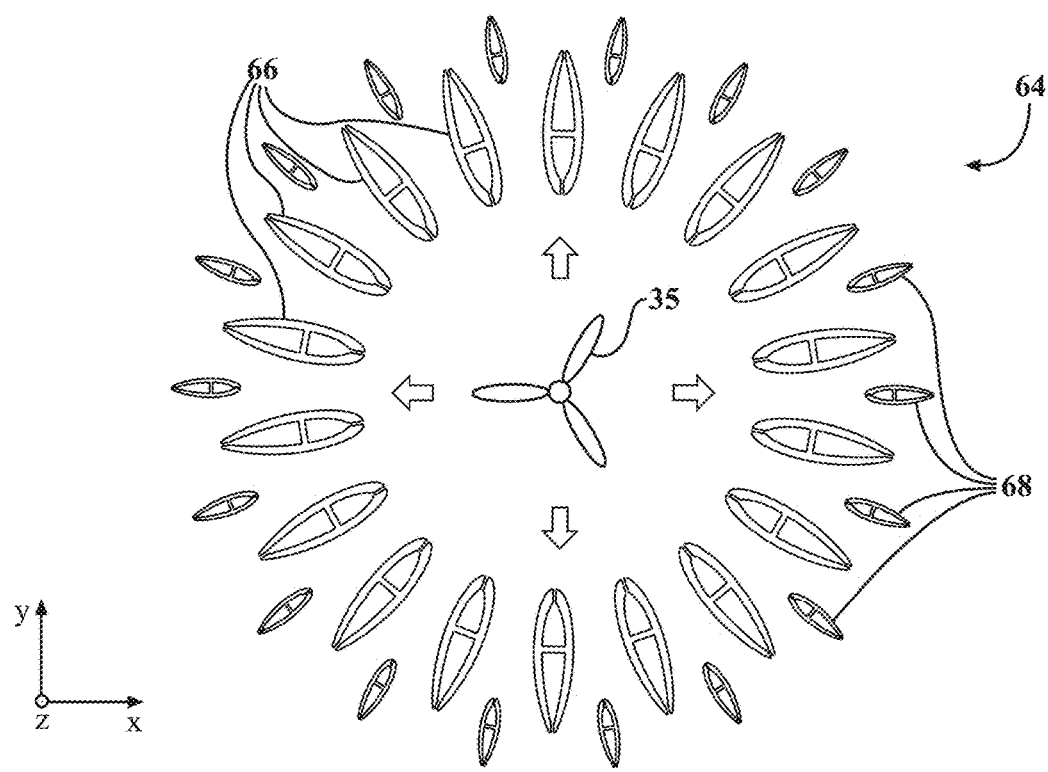
FIG. 8 is a top plan view of FIG. 7.

In various aspects, two or more broadband sparse acoustic absorber arrays can be layered. With renewed reference to the designs generally illustrated in FIGS. 1-6, FIG. 7 is a top perspective view of another aspect of a sound suppression assembly 64 for an air circulation device 35 surrounded by two sets, or arrays, of broadband sparse acoustic absorbers to create what may be referred to as a stacked or layered broadband sparse acoustic absorber in order to increase breadth of absorption. FIG. 8 is a top plan view of FIG. 7. The arrows in FIG. 8 indicate a direction of airflow as well as acoustic energy. As shown, first and second sets of a plurality of sparsely-arranged two-sided Helmholtz unit cells are provided in a concentric ring arrangement surrounding the air circulation device 35, for example, with each ring provided to absorb a different frequency. The innermost plurality of unit cells 66 are shown having a larger size, and may be designed for a low frequency. The outermost plurality of unit cells 68 are shown smaller in size relative to the innermost plurality of unit cells 66, and may be designed for an intermediate, or higher frequency. In an alternate aspect (not specifically shown), the placement of the different sized unit cells can be reversed, such that the smaller unit cells 68 are located closest to the air circulation device, and the larger unit cells 66 are disposed around the smaller unit cells 68. In the various aspects, the sets or arrays of the plurality of unit cells 66, 68 are generally arranged in a staggered relationship, such that they are not directly blocking one another from the acoustic energy and airflow. It should be understood that while the figures illustrate the sets of unit cells 66, 68 generally having the same geometries, other aspects may provide multiple sets or arrays of unit cells with one or more different geometries, different geometries, and/or different properties.

Figure 9:
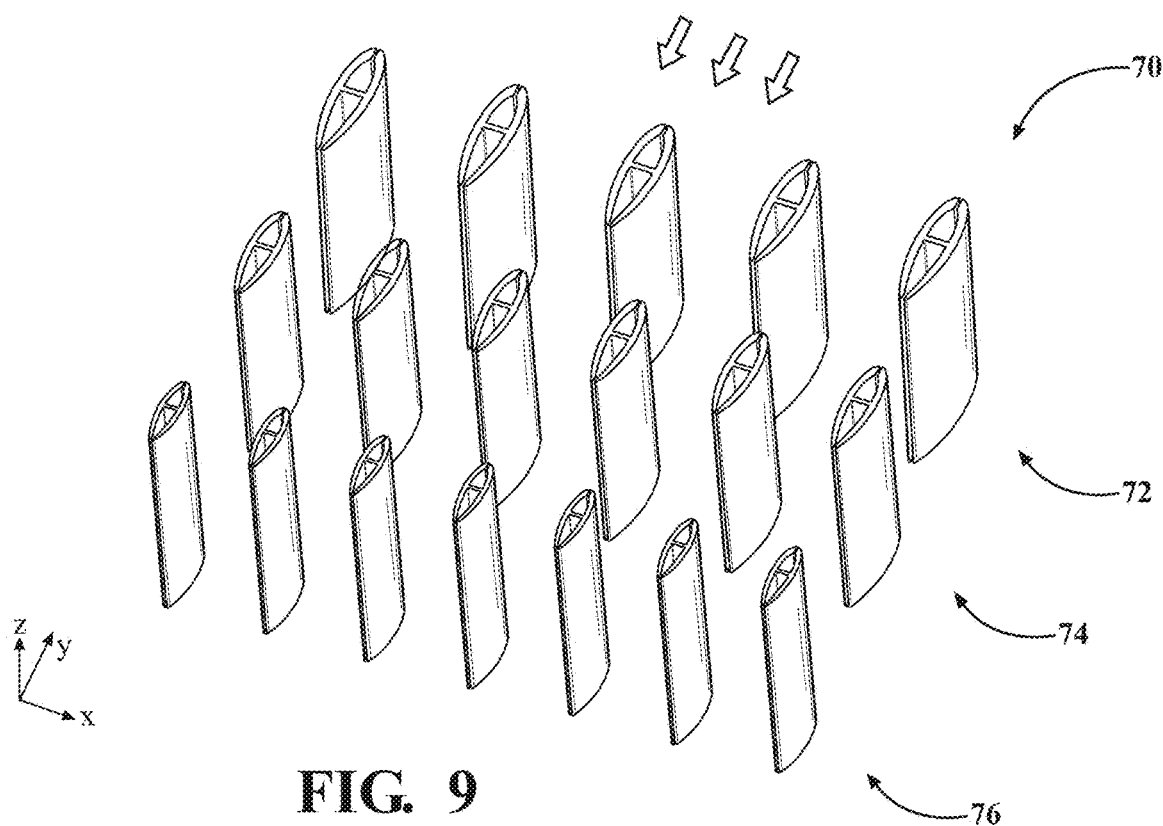
FIG. 9 is a top perspective view of a portion of a plurality of arrays of broadband sparse acoustic absorbers of different sizes that may be placed adjacent an air circulation device.
Figure 10:
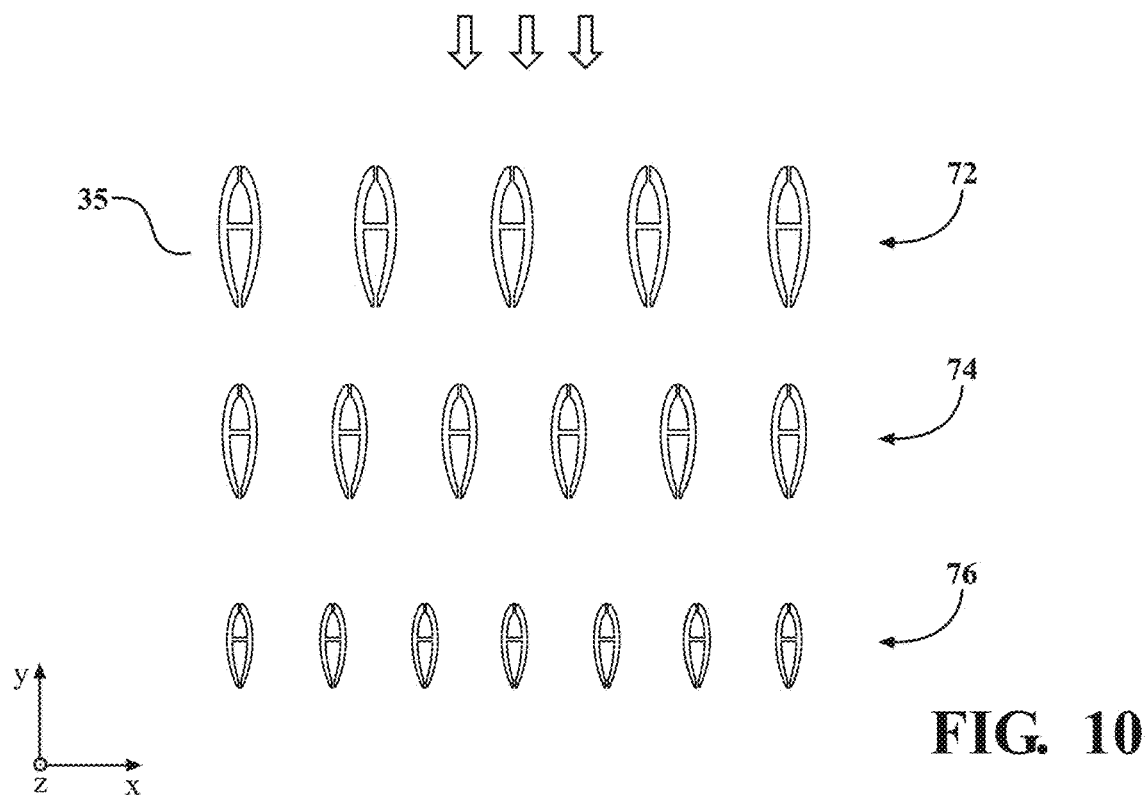
FIG. 10 is a top plan view of FIG. 9.

FIG. 9 is a top perspective view of another aspect of the present technology, showing a portion of an assembly 70 of three layered arrays 72 (low frequency), 74 (intermediate frequency), 76 (high frequency) of a plurality of broadband sparse acoustic absorbers of different sizes that may be placed adjacent an air circulation device (not shown). FIG. 10 is a top plan view of FIG. 9. The arrows in FIGS. 9-10 indicate a direction of airflow as well as acoustic energy. Although the layered arrays 72, 74, 76 are aligned in a linear format, other arrangements, such as curved or circular arrays may be used. Similarly, it should be understood that while the figures illustrate the arrays 72, 74, 76 of unit cells generally having the same geometries, other aspects may provide multiple sets or arrays of unit cells with one or more different geometries, different geometries, and/or different properties.

Figure 11:
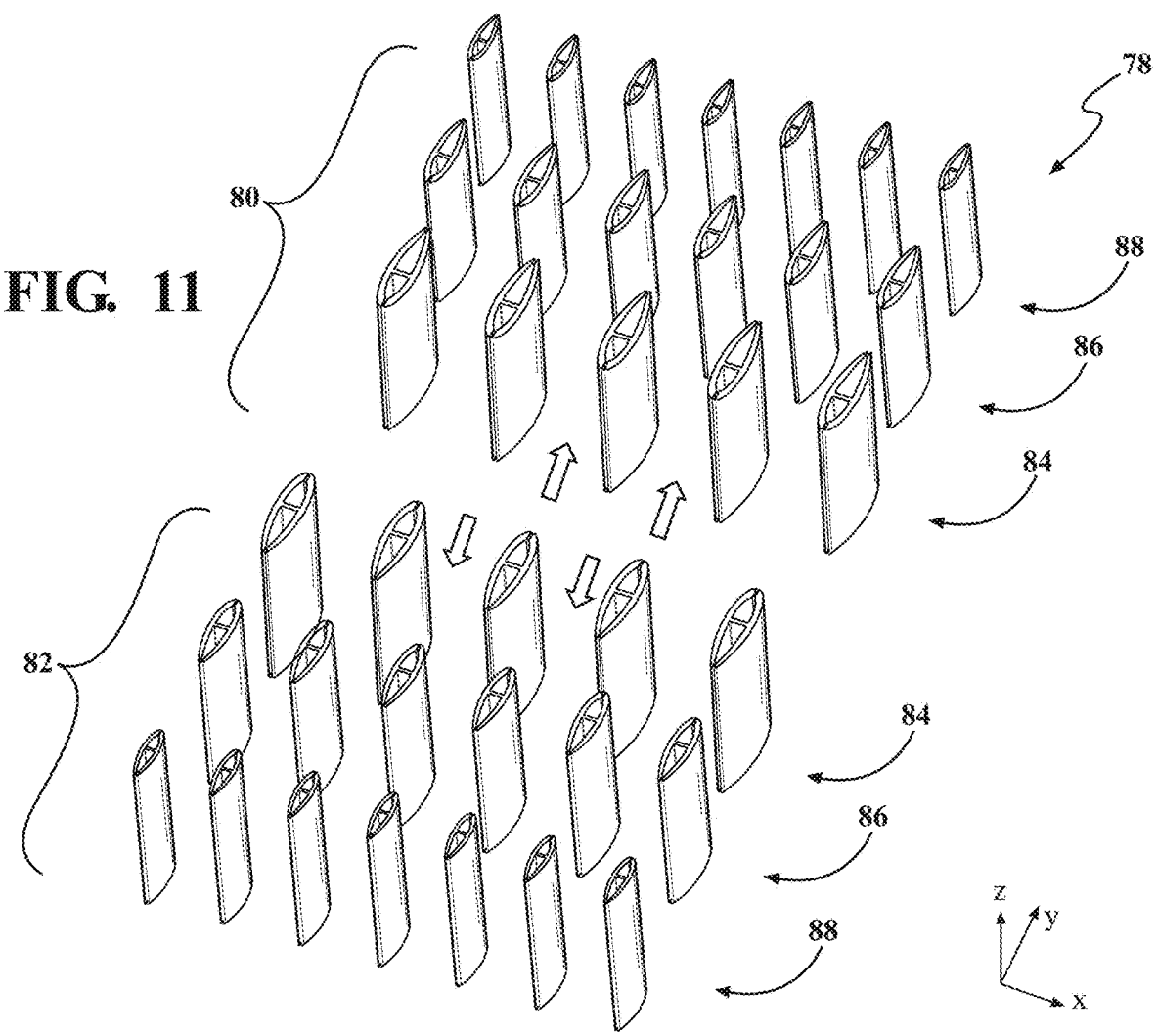
FIG. 11 is a top perspective view of a portion of two sets of a plurality of arrays of broadband sparse acoustic absorbers of different sizes that may be placed adjacent an air circulation device.
Figure 12:
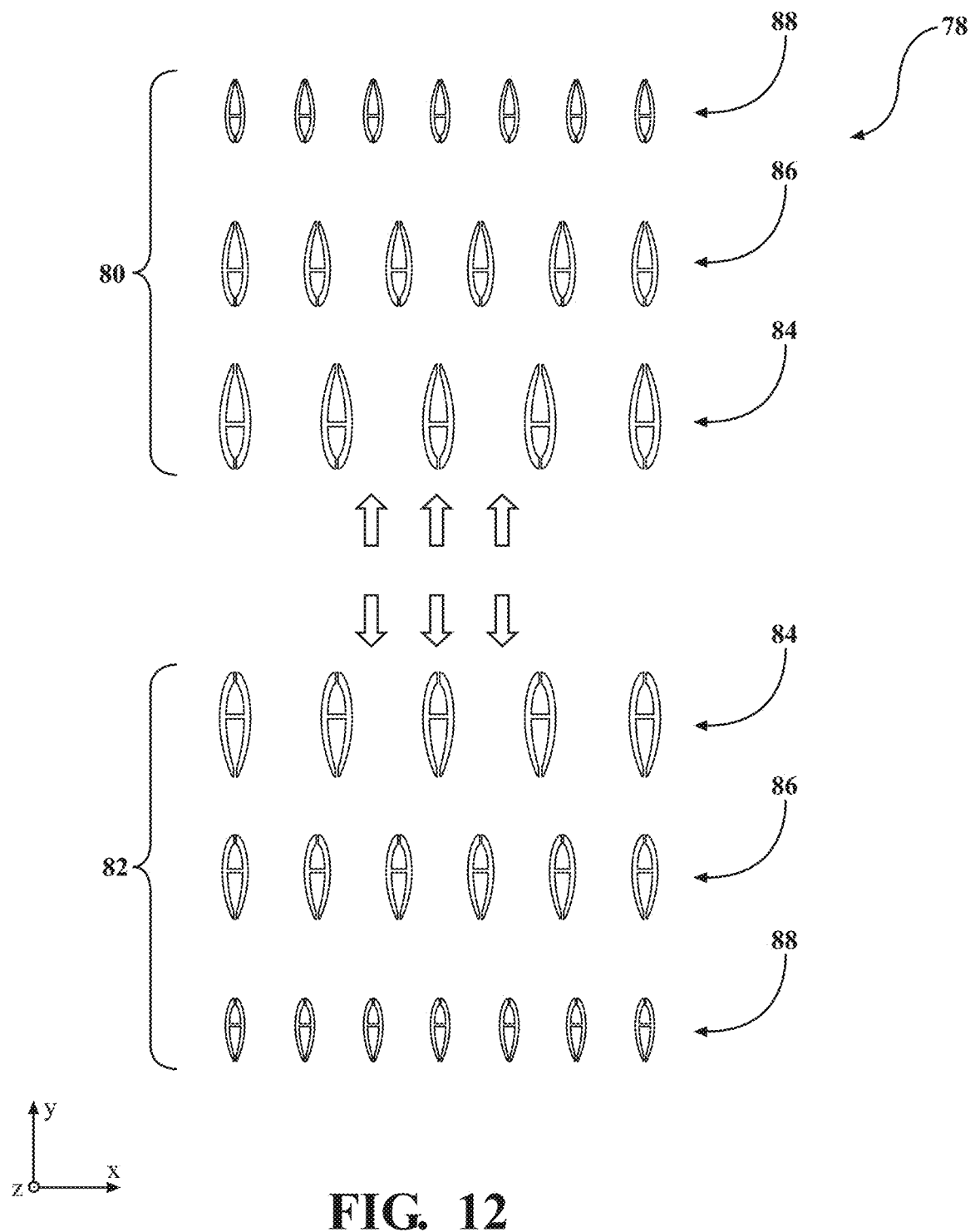
FIG. 12 is a top plan view of FIG. 11.

FIG. 11 is a top perspective view of another aspect of the present technology, showing a portion of an assembly 78 of two groupings 80, 82 of three layered arrays 84 (low frequency), 86 (intermediate frequency), 88 (high frequency) of a plurality of broadband sparse acoustic absorbers of different sizes that may be placed on opposing sides of an air circulation device (not shown). FIG. 12 is a top plan view of FIG. 11. The arrows in FIGS. 11-12 indicate a direction of airflow as well as acoustic energy. Although the layered arrays 84, 86, 88 are aligned in a linear format, other arrangements, such as curved or circular arrays may be used. Similarly, it should be understood that while the figures illustrate the arrays 84, 86, 88 of unit cells generally having the same geometries, other aspects may provide multiple sets or arrays of unit cells with one or more different geometries, different geometries, and/or different properties.

While the unit cells of FIGS. 1-12 are generally shown as having the first boundary wall 34 and the second boundary wall 36 cooperating to form a unit cell 32 having a cross-section defining a substantially ovoid or elongated oval shape/profile, with the first neck 44 and the second neck 46 disposed at opposing ends of the unit cells, other shapes are also contemplated. For example, the unit cells can alternately have a cross-sectional profile that is non-square rectangular, circular, triangular, diamond, prismatic cylindrical, conical, spherical, equilateral parallelograms, or any other shape that is suitable to enclose first and second Helmholtz resonators 40, 42 separated by at least one partition wall 38, or the like. In various aspects where the periodic array of unit cells 32 is a two-dimensional array, the two-dimensional array can have 90° rotational symmetry about an axis perpendicular to the surface of the substrate 25.

Figure 13:
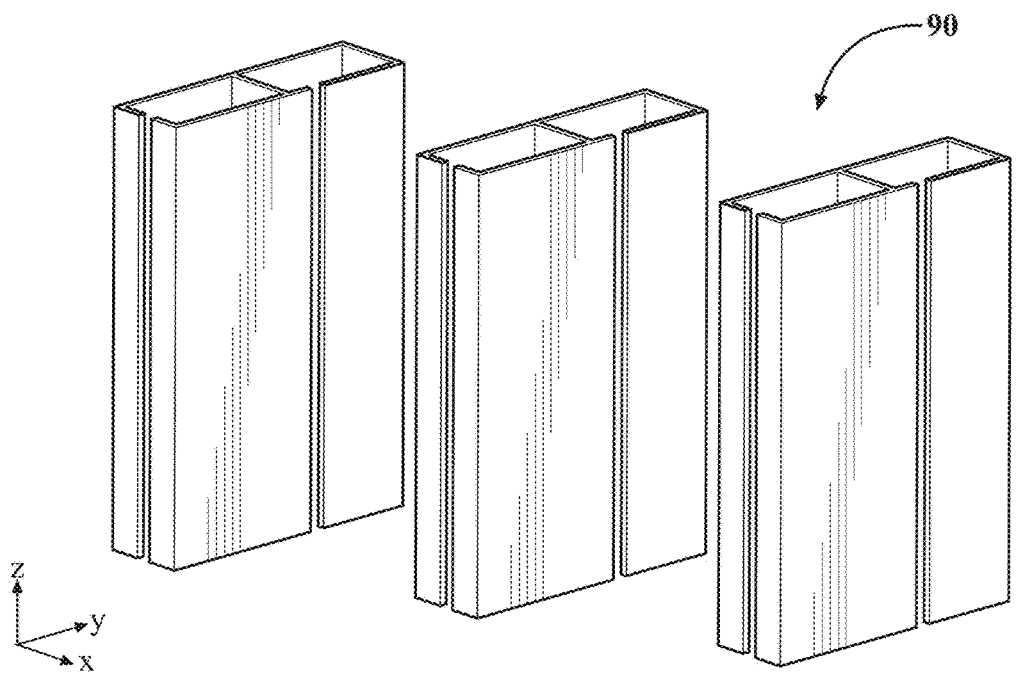
FIG. 13 illustrates a plurality of unit cells having a first alternate geometric design.
Figures 14A, 14B:
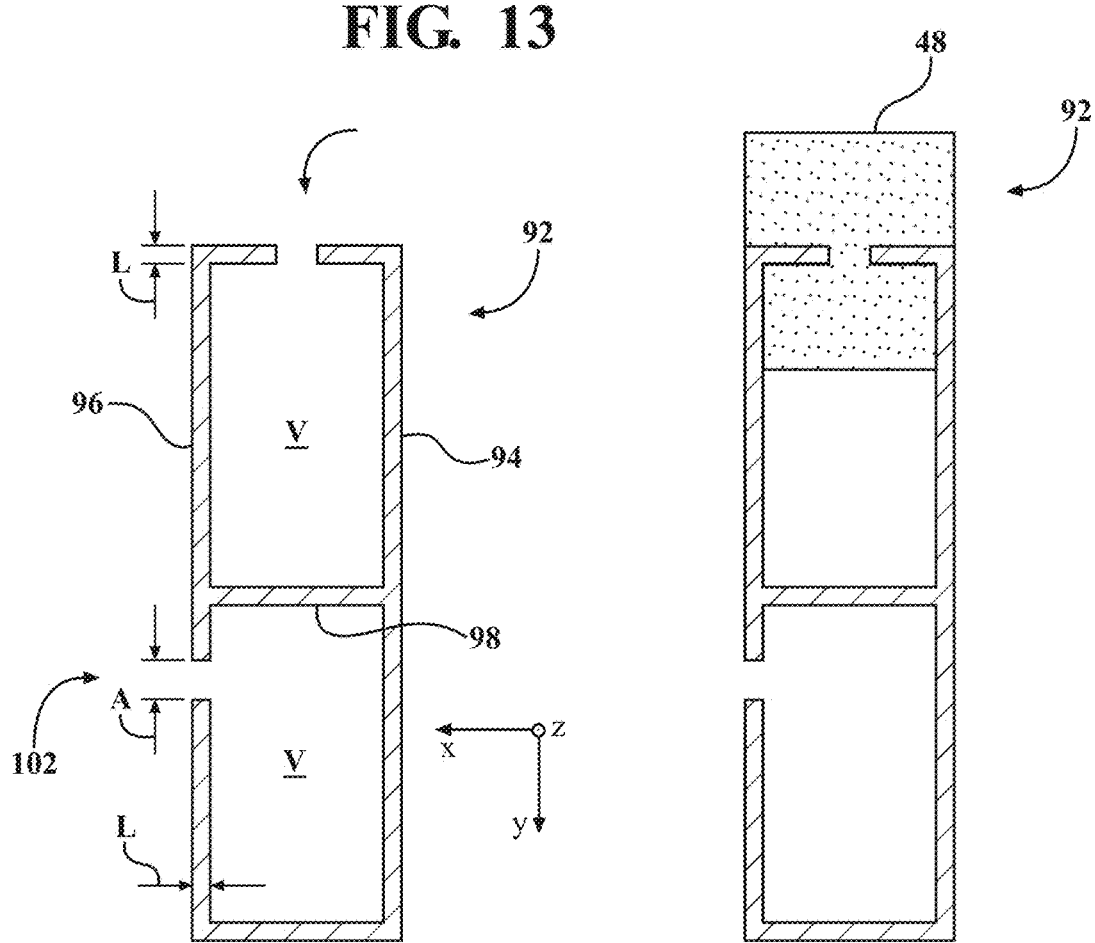
FIGS. 14A-14B are magnified cross-section views of a unit cell of FIG. 13 according to two aspects, with and without an acoustically absorbing medium.

FIG. 13 provides an array 90 of unit cells 92 having a non-square rectangular cross-sectional profile according to a first aspect. Functionally, the unit cells 92 of FIG. 13 are similar to the unit cells 32 previously described above, and can be used in the designs of the sound suppression systems and assemblies already discussed. FIG. 14A is a cross-sectional view of the unit cell 92, and illustrates an exemplary arrangement of boundary walls 94, 96 and a partition wall 98 that cooperate to define two resonators having first and second necks 100, 102. FIG. 14B is a cross-sectional view of the unit cell 92 including an optional acoustically absorbing medium 48 at least partially covering an outer area adjacent to the first neck 100 and contiguously filling the first neck and a fraction of the first chamber.

FIG. 15 provides an array 104 of unit cells 106 having a non-square rectangular cross-sectional profile according to a second aspect. Functionally, the unit cells 106 of FIG. 15 are also similar to the unit cells 32 previously described above, and can be used in the designs of the sound suppression systems and assemblies already discussed. FIG. 16A is a cross-sectional view of the unit cell 106, and illustrates an exemplary arrangement of boundary walls 108, 110 and a partition wall 112 that cooperate to define two resonators having first and second necks 114, 116. FIG. 16B is a cross-sectional view of the unit cell 92 including an optional acoustically absorbing medium 48 at least partially covering an outer area adjacent to the first neck 114 and contiguously filling the first neck and a fraction of the first chamber.

Figure 17:
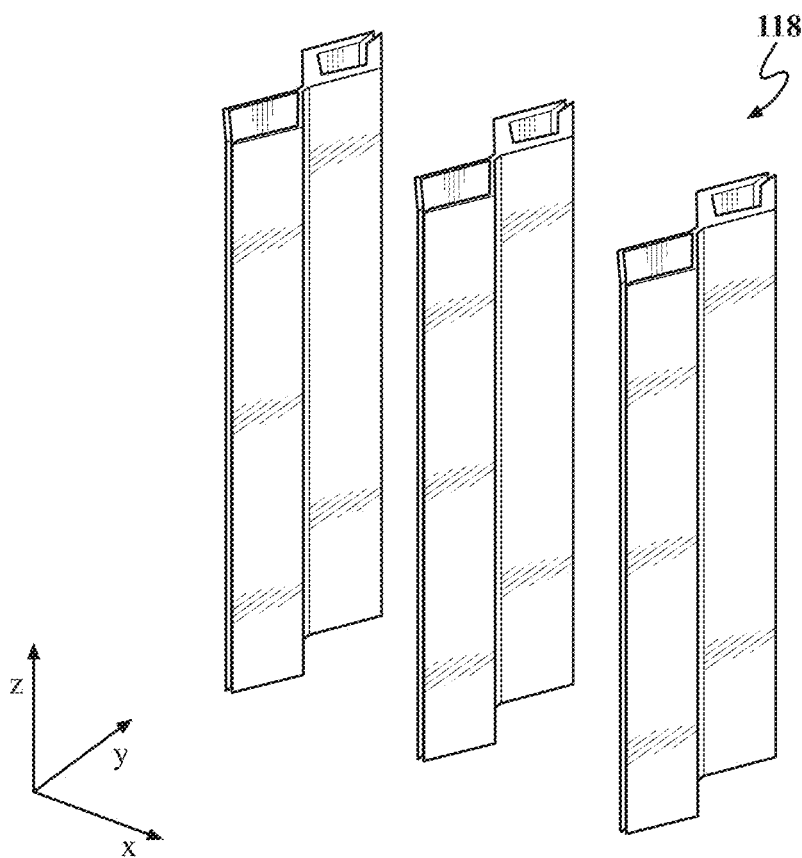
FIG. 17 illustrates a plurality of unit cells having a third alternate geometric design.
Figures 18A, 18B:
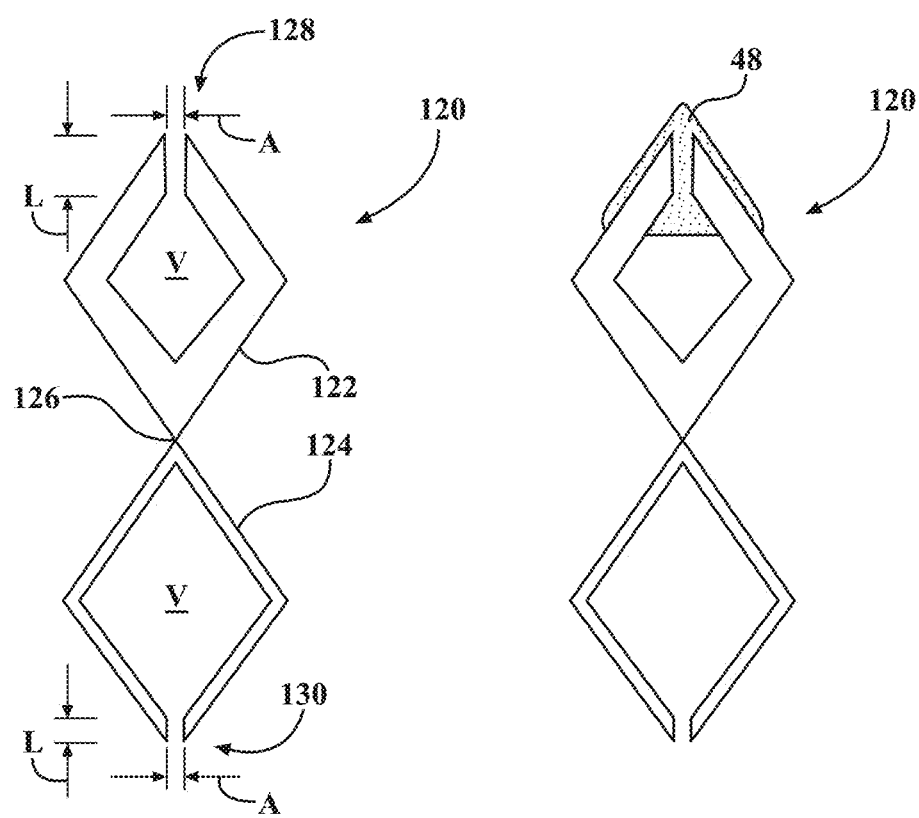
FIGS. 18A-18B are magnified cross-section views of a unit cell of FIG. 17 according to two aspects, with and without a sound absorbing foam.

FIG. 17 provides an array 118 of unit cells 120 having a cross-sectional profile with two equilateral parallelograms, which are shown having a substantially diamond pattern. Functionally, the unit cells 120 of FIG. 17 are also similar to the unit cells 32 previously described above, and can be used in the designs of the sound suppression systems and assemblies already discussed. FIG. 18A is a cross-sectional view of the unit cell 120, and illustrates an exemplary arrangement of boundary walls 122, 124 and a partition wall, or portion 126 that cooperate to define two resonators having first and second necks 128, 130. FIG. 18B is a cross-sectional view of the unit cell 120 including an optional acoustically absorbing medium 48 at least partially covering an outer area adjacent to the first neck 128 and contiguously filling the first neck and a fraction of the first chamber.

Figure 19:
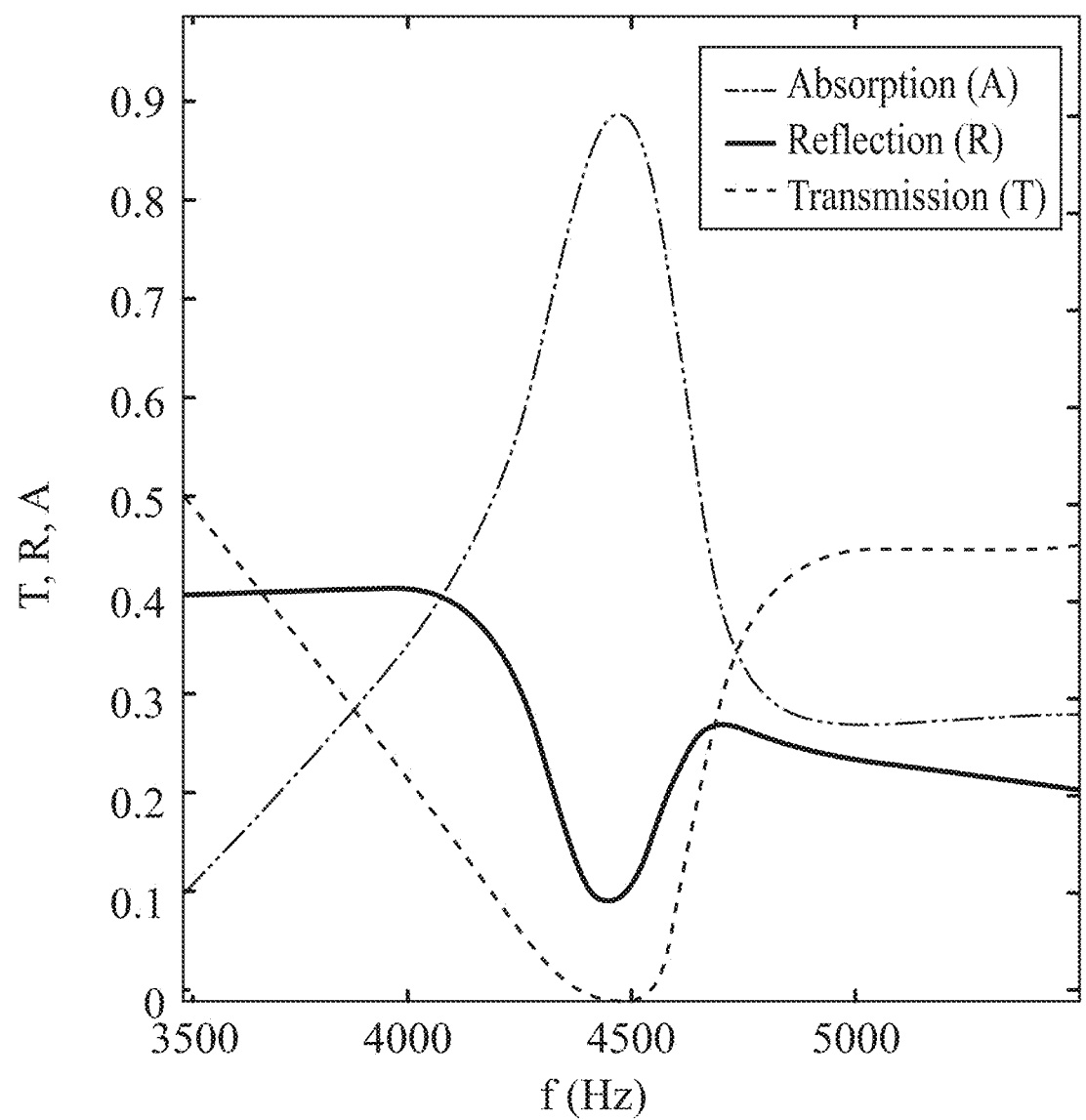
FIG. 19 is a graph of acoustic absorption, reflection, and transmission as a function of frequency for the assembly of FIGS. 1-2.

FIG. 19 is a graph of acoustic absorption, reflection, and transmission as a function of frequency for the assembly of FIGS. 1-2, illustrating the high acoustic absorption of about 90% at a frequency of about 4500 Hz.

Figure 20:
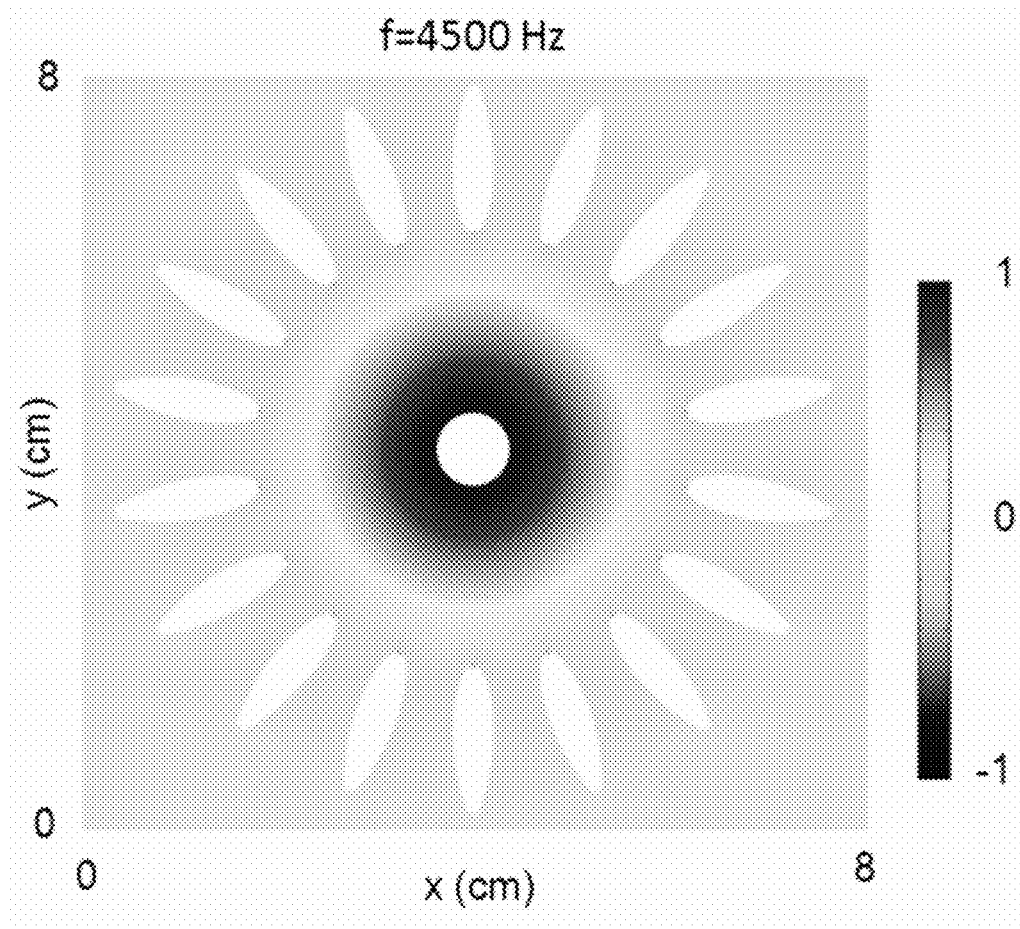
FIG. 20 illustrates a pressure field of the broadband sparse acoustic absorber of the type shown in FIGS. 1-2 at a frequency of 4500 Hz.

FIG. 20 illustrates a pressure field of the broadband sparse acoustic absorber of the type shown in FIGS. 1-2 at a frequency of 4500 Hz. A high pressure region is placed between the resonator array and the center of the array, where the acoustic noise source (i.e., the fan) is located.

The present teachings also provide methods of suppressing sound from an air circulation device. Referring generally to FIGS. 1-6, one exemplary method includes positioning a plurality of sparsely-arranged two-sided Helmholtz unit cells 32 disposed in a periodic array adjacent the air circulation device 35. As described above, each sparsely-arranged two-sided Helmholtz unit cell 32 may include a lossy resonator 40 directed to a source of acoustic energy from the air circulation device 35, and a lossless resonator 42. The lossy resonator 40 includes a first chamber portion 41 bounded by at least one first boundary wall 34 defining a first chamber volume $V_1$, and a first neck 44 forming an opening in the first chamber portion 41. The first neck 44 provides fluid communication between the first chamber portion 41 and an ambient environment. The lossless resonator 42 includes a second chamber portion 43 bounded by at least one second boundary wall 36 defining a second chamber volume $V_2$, and a second neck 46 forming an opening in the second chamber portion 43. The second neck provides fluid communication between the second chamber portion and the ambient environment. The method includes directing an airflow from the air circulation device 35 to the respective first necks 44 of the lossy resonators 40. In various aspects, the unit cells 32 may be disposed in a circular periodic array between an inner surface 58 of a shroud 56 and a central hub component 62. The method may also include aligning the shroud 56 with an airflow and incident acoustic energy from an axial fan 35. In other aspects, multiple sets of pluralities of unit cells 32 may be provided, for example, having different resonance frequencies. As disclosed herein, various geometries of the unit cells 32 can be used with the methods.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sound suppression assembly for absorbing acoustic energy from an air circulation device, the sound suppression assembly comprising:
   an air circulation device;
   a plurality of sparsely-arranged two-sided Helmholtz unit cells disposed in a periodic array adjacent the air circulation device,
   wherein each sparsely-arranged two-sided Helmholtz unit cell comprises:
      a lossy resonator having:
         a first chamber portion bounded by at least one first boundary wall defining a first chamber volume; and
         a first neck forming an opening in the first chamber portion providing fluid communication between the first chamber portion and an ambient environment; and
      a lossless resonator having:
         a second chamber portion bounded by at least one second boundary wall defining a second chamber volume; and
         a second neck forming an opening in the second chamber portion and providing fluid communication between the second chamber portion and the ambient environment.

2. The sound suppression assembly according to claim 1, wherein the plurality of sparsely-arranged two-sided Helmholtz unit cells are positioned on a porous substrate.

3. The sound suppression assembly according to claim 2, wherein the plurality of sparsely-arranged two-sided Helmholtz unit cells are positioned in a circular pattern with the first neck of the lossy resonators directed to a source of acoustic energy from the air circulation device.

4. The sound suppression assembly according to claim 1, wherein the plurality of sparsely-arranged two-sided Helmholtz unit cells are arranged in a circular pattern and spaced apart by a center to center periodic distance, P, wherein the center to center periodic distance, P, is greater than a maximum lateral width dimension, W, of each unit cell.

5. The sound suppression assembly according to claim 4, wherein the maximum lateral width dimension, W, is less than or equal to ½ of the center to center periodic distance, P.

6. The sound suppression assembly according to claim 1, wherein the second chamber volume is greater than the first chamber volume.

7. The sound suppression assembly according to claim 1, wherein a length of the first neck is greater than a length of the second neck.

8. The sound suppression assembly according to claim 1, wherein at least one of the sparsely-arranged two-sided Helmholtz unit cells comprises an acoustically absorbing medium at least partially covering an outer area adjacent to the first neck and contiguously filling the first neck and a fraction of the first chamber portion of the lossy resonator.

9. The sound suppression assembly according to claim 1, comprising first and second sets of a plurality of sparsely-arranged two-sided Helmholtz unit cells,
wherein the plurality of sparsely-arranged two-sided Helmholtz unit cells from the first set are disposed in a first circular periodic array adjacent the air circulation device and configured with a first frequency, and the plurality of sparsely-arranged two-sided Helmholtz unit cells from the second set are disposed in a second circular periodic array surrounding the plurality of sparsely-arranged two-sided Helmholtz unit cells from the first set and configured with a second frequency.

10. The sound suppression assembly according to claim 9, wherein the first frequency is lower than the second frequency.

11. The sound suppression assembly according to claim 1, wherein the first boundary wall and the second boundary wall cooperate to form a unit cell having a cross-section defining an elongated oval shape with the first neck and the second neck disposed at opposing ends.

12. The sound suppression assembly according to claim 1, wherein the first boundary wall and the second boundary wall cooperate to form a unit cell having a cross-section defining a non-square, rectangular shape.

13. The sound suppression assembly according to claim 1, wherein the first boundary wall and the second boundary wall cooperate to form a unit cell having a cross-section defining two equilateral parallelograms with the first neck and the second neck disposed at opposing ends.

14. A sound suppression assembly for absorbing acoustic energy from an axial fan, the sound suppression assembly comprising:
a shroud defining an inner surface and an outer surface;
a central hub component; and
a plurality of sparsely-arranged two-sided Helmholtz unit cells disposed in a periodic array between the inner surface of the shroud and the central hub component, wherein each sparsely-arranged two-sided Helmholtz unit cell comprises:
a lossy resonator having:
a first chamber portion bounded by at least one first boundary wall defining a first chamber volume; and
a first neck forming an opening in the first chamber portion providing fluid communication between the first chamber portion and an ambient environment; and
a lossless resonator having:
a second chamber portion bounded by at least one second boundary wall defining a second chamber volume; and
a second neck forming an opening in the second chamber portion and providing fluid communication between the second chamber portion and the ambient environment.

15. The sound suppression assembly according to claim 14, wherein the plurality of sparsely-arranged two-sided Helmholtz unit cells are positioned in a circular pattern with the first neck of the lossy resonators directed to a source of acoustic energy from the axial fan.

16. The sound suppression assembly according to claim 14, wherein the plurality of sparsely-arranged two-sided Helmholtz unit cells are arranged in a circular pattern and spaced apart by a mid-point to mid-point periodic distance, P, between adjacent second necks, wherein the mid-point to mid-point periodic distance, P, is greater than a maximum lateral width dimension, W, of each unit cell.

17. The sound suppression assembly according to claim 16, wherein the maximum lateral width dimension, W, is less than or equal to ½ of the mid-point to mid-point periodic distance, P.

18. The sound suppression assembly according to claim 14, wherein the first boundary wall and the second boundary wall cooperate to form a unit cell having a cross-section defining an elongated oval shape with the first neck and the second neck disposed at opposing ends.

19. A method of suppressing sound from an air circulation device, the method comprising:
positioning a plurality of sparsely-arranged two-sided Helmholtz unit cells disposed in a periodic array adjacent the air circulation device,
wherein each sparsely-arranged two-sided Helmholtz unit cell comprises:
a lossy resonator having:
a first chamber portion bounded by at least one first boundary wall defining a first chamber volume; and
a first neck forming an opening in the first chamber portion providing fluid communication between the first chamber portion and an ambient environment; and
a lossless resonator having:
a second chamber portion bounded by at least one second boundary wall defining a second chamber volume; and
a second neck forming an opening in the second chamber portion and providing fluid communication between the second chamber portion and the ambient environment; and
directing an airflow from the air circulation device to the respective first necks of the lossy resonators.

20. The method according to claim 19, wherein plurality of sparsely-arranged two-sided Helmholtz unit cells are disposed in a circular periodic array between an inner surface of a shroud and a central hub component, and directing the airflow from the air circulation device comprises aligning the shroud with airflow from an axial fan.

\* \* \* \* \*